United States Patent
Schweid

(10) Patent No.: US 9,702,759 B2
(45) Date of Patent: Jul. 11, 2017

(54) MACHINE LEARNING AND RATE-DISTORTION COST FUNCTIONS FOR ENABLING THE OPTIMIZATION OF DEVICE CALIBRATION

(71) Applicant: Xerox Corporation, Norwalk, CT (US)

(72) Inventor: Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 690 days.

(21) Appl. No.: 14/109,627

(22) Filed: Dec. 17, 2013

(65) Prior Publication Data

US 2015/0168184 A1    Jun. 18, 2015

(51) Int. Cl.
| | |
|---|---|
| *G01D 18/00* | (2006.01) |
| *G06N 99/00* | (2010.01) |
| *G01J 3/28* | (2006.01) |
| *G01J 3/52* | (2006.01) |

(52) U.S. Cl.
CPC .......... *G01J 3/28* (2013.01); *G01J 3/524* (2013.01); *G06N 99/005* (2013.01)

(58) Field of Classification Search
CPC .... G01J 3/28; G01J 3/524; G01J 3/00; G06N 99/005

See application file for complete search history.

(56) References Cited

U.S. PATENT DOCUMENTS

| | | | |
|---|---|---|---|
| 6,876,931 B2* | 4/2005 | Lorenz | A61B 5/14532 702/22 |
| 8,340,937 B2 | 12/2012 | Skinner et al. | |
| 2009/0009766 A1 | 1/2009 | Bonino et al. | |
| 2012/0296595 A1* | 11/2012 | Dalal | G01J 3/501 702/104 |

* cited by examiner

Primary Examiner — Mohamed Charioui
Assistant Examiner — Jeremy Delozier

(57) ABSTRACT

A method, non-transitory computer readable medium, and apparatus for applying a cost function to calculate an optimal value of a single variable for a calibration application are disclosed. For example, the method identifies the single variable of the calibration application, applies a cost function to the single variable, wherein the cost function comprises a function of a fit error plus a regularization weighting parameter ($\lambda$) times a regularization cost, calculates the optimal value of the single variable based upon the cost function that is applied to the single variable and uses the optimal value of the single variable to generate a calibration matrix used for the calibration application.

13 Claims, 3 Drawing Sheets

MACHINE LEARNING AND RATE-DISTORTION COST FUNCTIONS FOR ENABLING THE OPTIMIZATION OF DEVICE CALIBRATION

The present disclosure relates generally to calibrating a device to a known reference and, more particularly, to a method and an apparatus for applying a cost function to calculate an optimal value of a single variable for a calibration application.

BACKGROUND

In many applications it is necessary to calibrate a device to a known reference. For example, color characterization could be performed using an off-line spectrophotometer. The off-line device would measure patches on a device to be color corrected and an algorithm was executed that produced a color correction for the device. However, this process was highly resource intensive and required the operator to print a test target, measure it off-line and load the calculated correction on the device.

SUMMARY

According to aspects illustrated herein, there are provided a method, a non-transitory computer readable medium, and an apparatus for applying a cost function to calculate an optimal value of a single variable for a calibration application. One disclosed feature of the embodiments is a method that identifies the single variable of the calibration application, applies a cost function to the single variable, wherein the cost function comprises a function of a fit error plus a regularization weighting parameter ($\lambda$) times a regularization cost, calculates the optimal value of the single variable based upon the cost function that is applied to the single variable and uses the optimal value of the single variable to generate a calibration matrix used for the calibration application.

Another disclosed feature of the embodiments is a non-transitory computer-readable medium having stored thereon a plurality of instructions, the plurality of instructions including instructions which, when executed by a processor, cause the processor to perform an operation that identifies the single variable of the calibration application, applies a cost function to the single variable, wherein the cost function comprises a function of a fit error plus a regularization weighting parameter ($\lambda$) times a regularization cost, calculates the optimal value of the single variable based upon the cost function that is applied to the single variable and uses the optimal value of the single variable to generate a calibration matrix used for the calibration application.

Another disclosed feature of the embodiments is an apparatus comprising a processor and a computer readable medium storing a plurality of instructions which, when executed by the processor, cause the processor to perform an operation that identifies the single variable of the calibration application, applies a cost function to the single variable, wherein the cost function comprises a function of a fit error plus a regularization weighting parameter ($\lambda$) times a regularization cost, calculates the optimal value of the single variable based upon the cost function that is applied to the single variable and uses the optimal value of the single variable to generate a calibration matrix used for the calibration application.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for applying a cost function to calculate an optimal value of a single variable for a calibration application. As discussed above, various methods are used for calibrating a device to a reference device. For example, color may be calibrated in a multi-function device (MFD) (e.g., a printer) to a reference MFD to maintain color consistency. Currently used methods for calibration are either off-line or are not stable given only the data set of each patch generated by the device and the reference device.

One embodiment of the present disclosure resolves the stability issues for the pseudo-inverse techniques. For example, for any calibration application that relies on a single variable, a cost function may be applied to calculate an optimal value of the single variable that will provide a stable solution that can be applied to all data sets of a device being calibrated. One example application may be for calibrating colors of a printing device to the colors of a reference device. The stable solution using the disclosed methods will not provide a larger error for small changes in a data set.

As noted above, one example application of the calibration application may be for calibrating a multi-function device (MFD) to a reference MFD. Although the example described below is related to color calibration of k spectral values of the MFDs it should be noted that the embodiments of the present disclosure may be applied to any calibration application for any type of devices that is dependent on a single variable.

Figure 1:
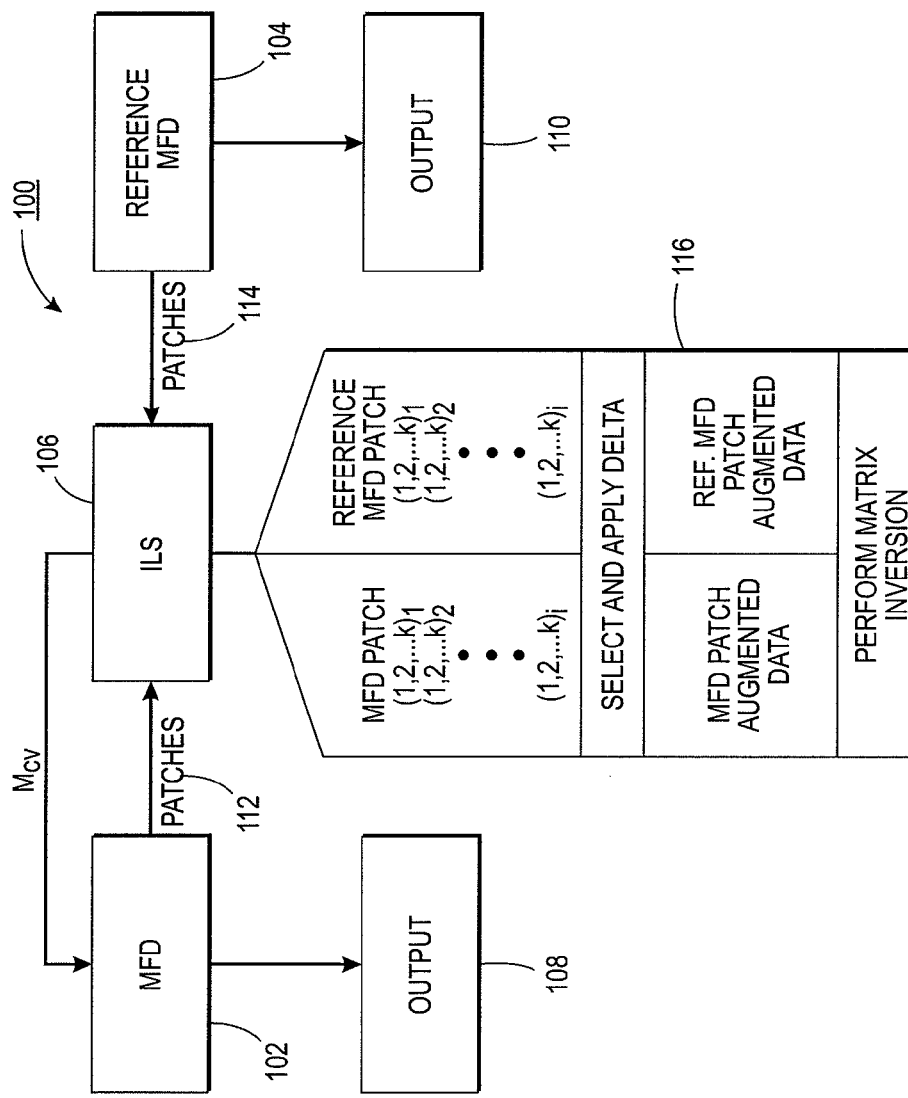
FIG. 1 illustrates an system for calibrating a device using augmented data.

FIG. 1 illustrates an example system 100 that applies a cost function to calculate an optimal value of a single variable for a calibration application. In one embodiment, the system 100 may include a multi-function device (MFD) 102 that is being calibrated to a reference MFD 104. In one embodiment, the MFD may be a printer, a copy machine, a fax machine, a printer/fax/copy machine, or any other device capable of producing an image. In one embodiment, the MFD 102 and the reference MFD 104 may include a processor and a computer readable memory similar to the general purpose computer 300 described below and illustrated in FIG. 3.

In one embodiment, the MFD 102 may produce an output 108 that is being calibrated to match an output 110 of the reference MFD. In one embodiment, the calibration may be to match the color of the output 108 (e.g., a color image) to the output 110 (e.g., a reference color image).

In one embodiment, an inline spectrophotometer (ILS) 106 may be deployed to perform the calibration in-line. The ILS 106 may include a processor and a computer readable memory similar to the general purpose computer 300 described below and illustrated in FIG. 3.

In one embodiment, the MFD 102 and the reference MFD 104 may provide a plurality of patches 112 and 114, respectively, to the ILS 106. In one embodiment, the ILS 106 may process the plurality of patches 112 and 114 as illustrated in box 116 to calculate a matrix of conversion values ($M_{CV}$) that is fed back to the MFD 102 to calibrate the MFD 102 to produce an output 108 that matches the output 110 of reference MFD 104.

As illustrated in the box 116, the ILS 106 may receive the plurality of patches 112 and 114 from the MFD 102 and the reference MFD 104, respectively, that include 1 to i patches each having 1 to k spectral values. For example, in one embodiment the calibration may be for color having 31 (e.g., k=31) spectral values. The calibration may be performed using a matrix of 31×31 calibration values.

Typically, the matrix is calculated using a matrix inversion technique. In most scenarios the matrix inversion technique works well where the number of data samples is greater than the number of inputs and outputs. For example, in the case of 31 spectral values it would be expected that a patch set size of 150 or more from the MFD 102 and reference MFD 104 to be sufficient for the inversion.

However, in the case of ILS calibration problem, the inversion is not stable. The inversion may depend on the patches from the MFD 102 spanning the entire space of 31 spectral values. However, in currently used methods, the patches do not span the entire space of 31 spectral values and a small amount of noise may result in drastically different values for the matrix. As a result, the matrix may be only suitable for the spectral values of the patch that was used to create the matrix.

The cause of the numerical instability may be due to the fact that all colors are created through weighted combination of CMYK, so in reality there are only about 7 degrees of freedom in determining the varying spectra of the MFD 102 and the reference MFD 104. In order to get more degrees of freedom more unique inks are needed and creating more patches does not resolve this problem.

One embodiment of the present disclosure resolves the instability by applying a cost function to calculate an optimal value of a single variable for a calibration application and applying the optimal value of the single variable to create an augmented data set. The augmented data set may then be used to perform the matrix inversion. The matrix inversion may be performed using an iterative process to converge the matrix to the matrix of calibration values, $M_{CV}$. In one embodiment, augmented data may be created for the MFD 102 and the reference MFD 104 to ensure that the patches of generated by the MFD 102 span the full space of 31 spectral values and not just a subset of it. The augmented data sets are purely mathematical and no additional measurements are necessary to create the augmented data sets.

In one embodiment, the single variable in the calibration application of the MFD 102 and the reference MFD 104 may be identified as a delta ($\delta$). The $\delta$ is provided as only one example and it should be noted that the single variable may be identified as any variable or symbol.

As illustrated in the box 116, one embodiment of the present disclosure may identify the single variable as a delta ($\delta$). In one embodiment, the $\delta$ may be selected and applied to the first plurality of patches 112 from the MFD 102 and the second plurality of patches 114 from the reference MFD 104. In one embodiment, the $\delta$ may be selected by applying a cost function to calculate the optimal value of a calibration application that relies on a single variable. For example, in one embodiment, of the present disclosure the single variable may be $\delta$.

In one embodiment, the cost function may be a function of a fit error plus a regularization weighting parameter ($\lambda$) times a regularization cost. The cost function may either increase the fit error while decreasing the regularization cost or decreasing the fit error while increasing the regularization cost.

In one embodiment, the cost function may comprise a machine learning cost function of delta ($J(\delta)$). The machine learning cost function ($J(\delta)$) may be represented by Equation (1) below:

$$J(\delta)=\|ISIS\_training\_spectra-M_\delta*ILS\_training\_spectra\|_F/E_{norm}+\lambda\|M\delta-g*I\|_F, \quad \text{Eq. (1):}$$

wherein the function $\|\ \|_F$ is a Frobenius norm of a matrix, ISIS_training_spectra are spectral values of a training data set of the reference device, $M_\delta$ is a calibration matrix (e.g., a matrix of calibration values described herein) whose calculation is generated by a calibration process that is dependent on the parameter $\delta$, ILS_training_spectra are spectral values of a training data set of the device being calibrated, $E_{norm}$ is a norm of an uncorrected device error represented as $\|ISIS\_training\_spectra-ILS\_training\_spectra\|_F$, g is an optional normalization term equal to a nominal gain between the training data set of the reference device and the training data set of the device to be calibrated and I is the identity matrix, wherein the fit error is represented by $\|ISIS\_training\_spectra-M_\delta*ILS\_training\_spectra\|_F/E_{norm}$ and the regularization cost is represented by $\|M_\delta-g*I\|_F$.

In one embodiment, the optimal value for $\delta$ may comprise a minimum of the machine learning cost function of Equation (1) over a range of values for $\lambda$. In one example, using ranges of $\lambda$ from 3 to 30 shows that the machine learning cost function has a common minimum that occurs around $-1.25 < \log(\delta) < 0.5$. Notably, the optimal solution may not be sensitive to $\lambda$. Thus, in one example, any value of $\log(\delta)$ between $-1.25$ and $0.5$ may provide a robust and well performing matrix of calibration values or characterization matrix.

In another embodiment, the cost function may comprise a rate distortion cost function of delta ($J(\delta)$). The rate distortion cost function may be similar to a compression optimization in the form of $J=D+\lambda*R$, wherein D is a measure of distortion (e.g., signal to noise ratio (SNR)) and R is a measure of rate in bits.

In one embodiment, the distortion used in compression techniques may be translated for the calibration problem as the difference in the spectral values of the patch from the reference MFD 104 and the corresponding spectral values of the corresponding patch from the MFD 102. This may be presented as a logarithmic function for the color calibration problem.

Notably, there are no "bits" in color calibration as defined in the compression techniques (e.g., zeros and ones). However, one embodiment of the present disclosure correlates the "bits" to the single variable $\delta$. As the value of $\delta$ approaches 0 the original data is maintained perfectly (corresponding to infinite bits) and as the value of $\delta$ approaches infinity, the original data is completely lost (corresponding to 0 bits). This value may also be presented as a logarithmic function for the color calibration problem. Given the non-obvious translations above, the rate distortion cost function ($J(\delta)$) may be represented by Equation (2) below:

$$J(\delta)=\log(\|ISIS\_training\_spectra-M_\delta*ILS\_training\_spectra\|_F)+\lambda*(-\log \delta), \quad \text{Eq. (2):}$$

wherein the function $\|\ \|_F$ is a Frobenius norm of a matrix, ISIS_training_spectra are spectral values of a training data set of the reference device, $M_\delta$ is a calibration matrix (e.g., a matrix of calibration values described herein) whose calculation is generated by a calibration process that is dependent on the parameter $\delta$, ILS_training_spectra are spectral values of a training data set of the device being calibrated, wherein the fit error is equivalent to a distortion represented by log ($\|ISIS\_training\_spectra-M_\delta*ILS\_training\_spectra\|_F$) and the regularization cost is equivalent to a rate represented by ($-\log \delta$).

In one embodiment, the optimal value for $\delta$ may comprise a minimum of the rate distortion cost function of Equation (2) over a range of values for $\lambda$. In one example, using ranges of $\lambda$ from 0.1 to 0.3 shows that the rate distortion cost function has a common minimum that occurs around $0.5<\log(\delta)<2.0$. Notably, the optimal solution may not be sensitive to A. Thus, in one example, any value of $\delta$ between 0.5 and 2 may provide a robust and well performing matrix of calibration values or characterization matrix.

Once the optimal value for $\delta$ is selected using one of the cost functions described above, the $\delta$ may be applied k times to each of the k spectral values of each one of the i patches generated by the MFD 102 and the reference MFD 104.

In one embodiment, the first augmented data set for the MFD 102 being calibrated may be created using the following Equation (3):

$$ILS\_spectra(i,j)=ILS\_spectra(i)+\delta*H(j)(1\leq j\leq k), \quad \text{Eq. (3):}$$

wherein ILS_spectra(i) is the ith patch of the MFD 102, ILS_spectra(i,j) is the jth augmented data vector generated from the ILS_spectra(i), and HO) is the jth basis vector of a Hadamard matrix. Equation (3) may apply the $\delta$ k times to each one of the k spectral values of each one of the first plurality of patches to create the first augmented data set.

In one embodiment, any orthonormal matrix that completely spans the k spectral values may be used. The orthonormal matrix may determine whether the $\delta$ is added or subtracted to a corresponding spectral value in a 31×31 matrix. In one embodiment, the orthonormal matrix may be the Hadamard matrix as used in Equation (3).

In one embodiment, the first augmented data set may be set as a constant and used in each iteration of a function for a solution to finding $M_{CV}$. In one embodiment, the $M_{CV}$ may be calculated based on an equation used to generate a second augmented data set for the reference MFD 104 crated using the following Equation (4):

$$ISIS\_spectra(i,j)=ISIS\_spectra(i)+\delta*M_{CV}*H(j)(1\leq j\leq k) \quad \text{Eq. (4):}$$

wherein ISIS_spectra(i) is the ith patch of the reference MFD 104, ISIS_spectra(i,j) is the jth augmented data vector generated from the ISIS_spectra(i).

In one embodiment, $M_{CV}$ may represent the matrix that calibrates the spectral values of each path for the MFD 102 to the reference MFD 104 according to Equation (5):

$$ISIS\_spectra(i,j)=M_{CV}*ILS\_spectra(i,j) \quad \text{Eq. (5):}$$

For example, the first augmented data set ILS_spectra (i,j) for the MFD 102 and the second augmented data set ISIS_spectra (i,j) for the reference MFD 102 may be used to calculate the matrix of calibration values, $M_{CV}$ using a pseudo-inversion technique that solves a minimum mean square error (MMSE) fit problem using Equation (6):

$$M_{CV}=ISIS\_spectra(i,j)*pinv(ILS\_spectra(i,j)) \quad \text{Eq. (6):}$$

where $pinv(X)=X^T(XX^T)^{-1}$.

It is recognized that Equation (4) includes $M_{CV}$ that requires the second augmented data set ISIS_spectra(i,j) in order to calculate the second augmented data set ISIS_spectra(i,j). However, in one embodiment, Equation (4) may be solved using an iterative process that converges to a solution for $M_{CV}$. In one embodiment, the identity matrix (I) may be used as an initial guess for $M_{CV}$ using a-priori knowledge that the matrix of conversion values is nearly identity to initialize the Equation (4). In other words, it is assumed that the MFD 102 and the reference MFD 104 are extremely similar with slightly different operating environments. Therefore, if $\delta$ is small, Equation (4) may be approximated by Equation (7):

$$ISIS\_spectra(i,j)=ISIS\_spectra(i)+g*\delta*I*H(j)(1\leq j\leq k), \quad \text{Eq. (7):}$$

wherein g is a gain comprising a standard deviation of a reference device spectrum divided by a standard deviation of the device spectrum and I is the identity matrix. In one embodiment, the gain g may be optional and may be set to 1 if calculation time is paramount.

In one embodiment, using Equation (7) as a starting point that initializes Equation (4), an iterative process may be applied to Equation (7) to update I to an intermediate matrix that is calculated. The iterative process may be repeated using a weighted average of the intermediate matrix that is previously calculated and the identity matrix I according to Equation (8):

$$ISIS\_spectra(i,j)=ISIS\_spectra(i)+\delta*[a*M_{prev}+(1-a)*g*I]*H(j)(1\leq j\leq k), \quad \text{Eq. (8):}$$

wherein a is a constant weighting factor that determines how much a previous iteration changes a next set of spectra and $M_{prev}$ is a previous matrix result from the previous iteration.

Equation (8) may be repeated until the Equation (8) converges on a solution for $M_{CV}$. In one embodiment, the matrix of calibration values $M_{CV}$ may then be transmitted back to the MFD 102 to calibrate the spectral values of the MFD 102 as illustrated in FIG. 1. In one embodiment, the process may be repeated by the ILS 106 for a plurality of MFDs that are manufactured to ensure that each manufactured MFD is calibrated to the reference MFD 104.

It should be noted that although a multi-function device for calibrating colors was used as an example to illustrate the calibration process of the present disclosure, that the present disclosure may be applied to any type of calibration application. In other words, the present process may be applied to any calibration dependent on a single variable.

Figure 2:
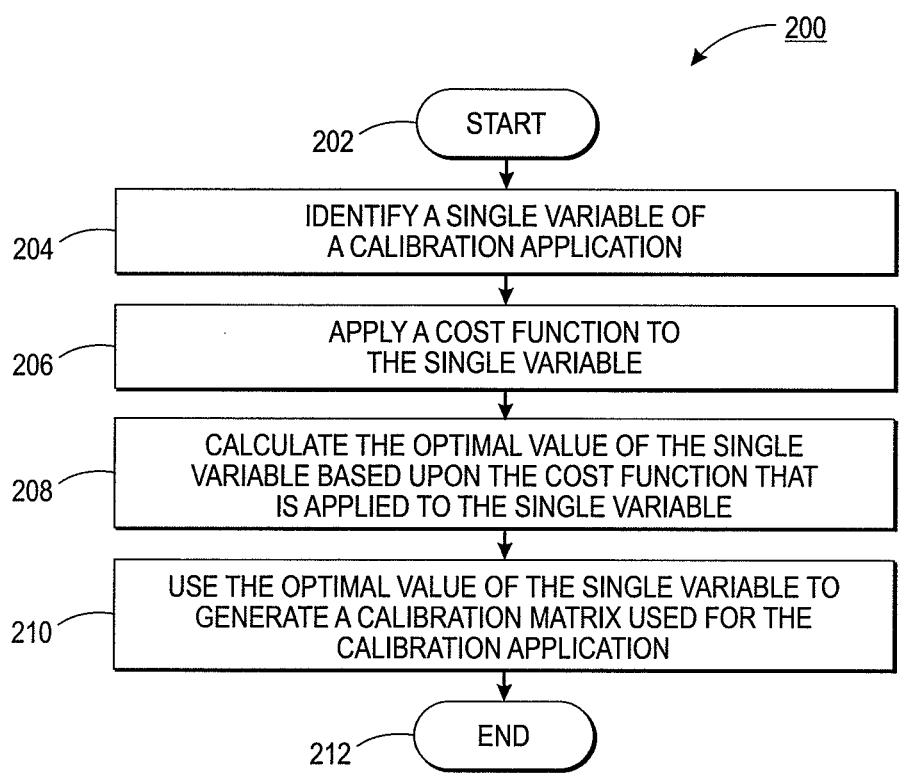
FIG. 2 illustrates an example flowchart of a method for applying a cost function to calculate an optimal value of a single variable for a calibration application.
Figure 3:
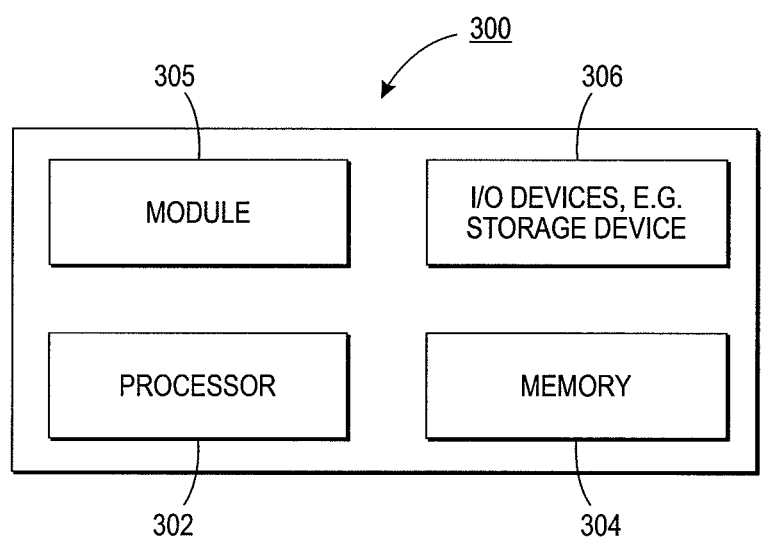
FIG. 3 illustrates a high-level block diagram of a general-purpose computer suitable for use in performing the functions described herein.

FIG. 2 illustrates a flowchart of a method 200 for applying a cost function to calculate an optimal value of a single variable for a calibration application. In one embodiment, one or more steps or operations of the method 200 may be performed by the ILS 106 or a general-purpose computer 200 as illustrated in FIG. 3 and discussed below.

The method 200 begins at step 202. At step 204, the method 200 identifies a single variable of a calibration application. For example, in one embodiment, the calibration application may be to calibrate k spectral values of a device to the k spectral values of a reference device. In one embodiment, the calibration may be performed using an augmented data set as described above. The augmented data set may be a function of a single variable delta ($\delta$).

At step 206, the method 200 applies a cost function to the single variable. In one embodiment, the cost function may comprise a function of a fit error plus a regularization weighting parameter λ times a regularization cost. In one embodiment, as λ is varied, a calibration matrix may be generated that either increases fit error while decreasing the regularization cost or decreases the fit error while increasing the regularization cost.

In one embodiment, the cost function may comprise a machine learning cost function. The machine learning cost function may be represented by Equation (1), described above.

In another embodiment, the cost function may comprise a rate distortion cost function. The rate distortion cost function may be similar to a compression optimization in the form of J=D+λ*R, wherein D is a measure of distortion (e.g., signal to noise ratio (SNR)) and R is a measure of rate in bits.

In one embodiment, the distortion used in compression techniques may be translated for the calibration problem as the difference in the spectral values of the patch from the reference device and the corresponding spectral values of the corresponding patch from the device being calibrated. This may be presented as a logarithmic function for the color calibration problem.

Notably, there are no "bits" in color calibration as defined in the compression techniques (e.g., zeros and ones). However, one embodiment of the present disclosure correlates the "bits" to the single variable identified as δ. As the value of δ approaches 0 the original data is maintained perfectly (corresponding to infinite bits) and as the value of δ approaches infinity, the original data is completely lost (corresponding to 0 bits). This value may also be presented as a logarithmic function for the color calibration problem. In one embodiment, the rate distortion cost function may be represented by Equation (2), described above.

At step 208, the method 200 calculates the optimal value of the single variable based upon the cost function that is applied to the single variable. For example, the optimal value of the single variable may be calculated by using a range of λ and determining a common minimum. In one embodiment, a common minimum range may be found and any value within the range may provide an optimal value for the single variable.

For example, when the machine learning cost function of Equation (1) is used, a range of λ from 3 to 30 may be used. The range of λ from 3 to 30 shows that the machine learning cost function has a common minimum that occurs around $-1.25 < \log(\delta) < 0.5$. Notably, the optimal solution may not be sensitive to λ. Thus, in one example, any value of log (δ) between −1.25 and 0.5 may provide a robust and well performing matrix of calibration values or characterization matrix.

In another example, when the rate distortion cost function of Equation (2) is used, a range of λ from 0.1 to 0.3 may be used. The range of λ from 0.1 to 0.3 shows that the rate distortion cost function has a common minimum that occurs around $0.5 < \log(\delta) < 2.0$. Notably, the optimal solution may not be sensitive to λ. Thus, in one example, any value of δ between 0.5 and 2 may provide a robust and well performing matrix of calibration values or characterization matrix.

At step 210, the method 200 uses the optimal value of the single variable to generate a calibration matrix used for the calibration application. For example, the optimal value of the single variable that is selected using one of the cost functions described above may be used in a calibration application to obtain a calibration matrix.

In one embodiment, the calibration application may be calibrating k spectral values of a device to k spectral values of a reference device. The calibration may require the calculation of a matrix of calibration values as described above in Equations (4)-(8). Thus, the calibration matrix (e.g., the matrix of calibration values) may be calculated or obtained and then applied to a device to calibrate the device. At step 212, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for applying a cost function to calculate an optimal value of a single variable for a calibration application, and various input/output devices 306 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 305 for applying a cost function to calculate an optimal value of a single variable for a calibration application can be loaded into memory 304 and executed by processor 302 to implement the functions as discussed above. As such, the present method 305 for applying a cost function to calculate an optimal value of a single variable for a calibration application (including associated data structures) of the present disclosure can be stored on a non-transitory (e.g., physical and tangible) computer readable storage medium, e.g., RAM memory, magnetic or optical drive or diskette and the like. For example, the hardware processor 302 can be programmed or configured with instructions (e.g., computer readable instructions) to perform the steps, functions, or operations of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for applying a cost function to calculate an optimal value of a single variable for a calibration application, comprising:
   identifying, by a processor, the single variable of the calibration application;
   applying, by the processor, the cost function to the single variable, wherein the cost function comprises a function of a fit error plus a regularization weighting parameter (λ) times a regularization cost, wherein the cost function comprises a machine learning cost function of a delta (J(δ)), $$J(\delta)=\|ISIS\_training\_spectra-M_\delta*ILS\_training\_spectra\|_F/E_{norm}+\lambda\|M_\delta-g*I\|_F,$$

wherein the function $\|\ \|_F$ is a Frobenius norm of a matrix, ISIS_training_spectra are spectral values of a training data set of a reference device, $M_\delta$ is a calibration matrix whose calculation is generated by a calibration process that is dependent on a parameter δ, ILS_training_spectra are spectral values of a training data set of a multi-function device being calibrated, $E_{norm}$ is a norm of an uncorrected device error represented as $\|ISIS\_training\_spectra-ILS\_training\_spectra\|_F$, g is an optional normalization term equal to a nominal gain between the training data set of the reference device and the training data set of the multi-function device to be calibrated and I is the identity matrix, wherein the fit error is represented by $\|ISIS\_training\_spectra-M_\delta*ILS\_training\_spectra\|_F/E_{norm}$ and the regularization cost is represented by $\|M_\delta-g*I\|_F$;
   calculating, by the processor, the optimal value of the single variable based upon the cost function that is applied to the single variable; and
   calibrating, by the processor, the multi-function device with the calibration application that uses the optimal value of the single variable to generate a calibration matrix used for the calibration application.

2. The method of claim 1, wherein the processor is in an in-line spectrophotometer (ILS) of the multi-function device.

3. The method of claim 1, wherein the calibration application comprises calibrating k spectral values of the multi-function device to the reference device.

4. The method of claim 1, further comprising:
   varying, by the processor, the single variable that results in the calibration matrix increasing the fit error while decreasing the regularization cost or decreasing the fit error while increasing the regularization cost.

5. The method of claim 1, wherein the optimal value for the single variable δ comprises a minimum of the machine learning cost function over a range of values for λ.

6. A method for applying a cost function to calculate an optimal value of a single variable for a calibration application, comprising:
   identifying, by a processor, the single variable of the calibration application;
   applying, by the processor, the cost function to the single variable, wherein the cost function comprises a function of a fit error plus a regularization weighting parameter (λ) times a regularization cost, wherein the cost function comprises a rate-distortion cost function of a delta (J(δ)), $$J(\delta)=\log(\|ISIS\_training\_spectra-M_\delta*ILS\_training\_spectra\|_F)+\lambda*(-\log\delta),$$

wherein the function $\|\ \|_F$ is a Frobenius norm of a matrix, ISIS_training_spectra are spectral values of a training data set of a reference device, $M_\delta$ is a calibration matrix whose calculation is generated by a calibration process that is dependent on a parameter δ, ILS_training_spectra are spectral values of a training data set of a multi-function device being calibrated, wherein the fit error is equivalent to a distortion represented by $\log(\|ISIS\_training\_spectra-M_\delta*ILS\_training\_spectra\|_F)$ and the regularization cost is equivalent to a rate represented by $(-\log\delta)$;
   calculating, by the processor, the optimal value of the single variable based upon the cost function that is applied to the single variable; and
   calibrating, by the processor, the multi-function device with the calibration application that uses the optimal value of the single variable to generate a calibration matrix used for the calibration application.

7. The method of claim 6, wherein the optimal value for the single variable δ comprises a minimum of the rate-distortion cost function over a range of values for λ.

8. The method of claim 7, further comprising:
   verifying, by the processor, the optimal value for the single variable δ is within an acceptable range of values based upon minimum values that are common between the range of values for λ.

9. A non-transitory computer-readable medium storing a plurality of instructions which, when executed by a processor, cause the processor to perform operations for applying a cost function to calculate an optimal value of a single variable for a calibration application, the operations comprising:
   identifying the single variable of the calibration application;
   applying the cost function to the single variable, wherein the cost function comprises a function of a fit error plus a regularization weighting parameter (Δ) times a regularization cost, wherein the cost function comprises a machine learning cost function of a delta (J(δ)), $$J(\delta)=\|ISIS\_training\_spectra-M_\delta*ILS\_training\_spectra\|_F/E_{norm}+\lambda\|M_\delta-k*I\|_F,$$

wherein the function $\|\ \|_F$ is a Frobenius norm of a matrix, ISIS_training_spectra are spectral values of a training data set of a reference device, $M_\delta$ is a calibration matrix whose calculation is generated by a calibration process that is dependent on a parameter δ, ILS_training_spectra are spectral values of a training data set of a multi-function device being calibrated, $E_{norm}$ is a norm of an uncorrected device error represented as $\|ISIS\_training\_spectra-ILS\_training\_spectra\|_F$, k is an optional normalization term equal to a nominal gain between the training data set of the reference device and the training data set of the multi-function device to be calibrated and I is the identity matrix, wherein the fit error is represented by $\|ISIS\_training\_spectra-M_\delta*ILS\_training\_spectra\|_F/E_{norm}$ and the regularization cost is represented by $\|M_\delta-g*I\|_F$;
   calculating the optimal value of the single variable based upon the cost function that is applied to the single variable; and
   calibrating the multi-function device with the calibration application that uses the optimal value of the single variable to generate a calibration matrix used for the calibration application.

10. The non-transitory computer-readable medium of claim 9, wherein the processor is in an in-line spectrophotometer (ILS) of the multi-function device.

11. The non-transitory computer-readable medium of claim 9, wherein the calibration application comprises calibrating k spectral values of the multi-function device to the reference device.

12. The non-transitory computer-readable medium of claim 9, the operations further comprising:
varying the single variable that results in the calibration matrix increasing the fit error while decreasing the regularization cost or decreasing the fit error while increasing the regularization cost.

13. The non-transitory computer-readable medium of claim 9, wherein the optimal value for the single variable $\delta$ comprises a minimum of the machine learning cost function over a range of values for $\lambda$.

* * * * *